United States Patent [19]
Roesel

[11] 3,797,813
[45] Mar. 19, 1974

[54] CONTROL APPARATUS FOR METALWORKING TOOLS

[76] Inventor: Vernon H. Roesel, Rt. 1, Box 131M, Cypress, Tex. 77429

[22] Filed: May 26, 1972

[21] Appl. No.: 257,440

Related U.S. Application Data

[63] Continuation-in-part of Ser. No. 100,573, Dec. 22, 1970, Pat. No. 3,741,555.

[52] U.S. Cl............... 266/23 M, 266/23 N, 228/29
[51] Int. Cl......................... B23k 7/04, B23k 37/02
[58] Field of Search.... 266/23 R, 23 K, 23 L, 23 M, 266/23 N, 23 NN; 228/9, 29

[56] References Cited
UNITED STATES PATENTS

| | | |
|---|---|---|
| 2,437,025 | 3/1948 | Hatten .......................... 266/23 NN |
| 2,545,666 | 3/1951 | Lonngren ...................... 266/23 NN |
| 1,858,077 | 5/1932 | Douglass et al. ............... 266/23 NN |
| 2,463,075 | 3/1949 | Young .............................. 266/23 L |
| 2,495,360 | 1/1950 | Young ............................ 266/23 NN |
| 3,388,901 | 6/1968 | Ferguson ........................ 266/23 N |
| 3,409,282 | 11/1968 | Livers .............................. 266/23 N |

Primary Examiner—Gerald A. Dost
Attorney, Agent, or Firm—Pravel, Wilson & Matthews

[57] ABSTRACT

A new and improved apparatus for controlling the movement and spacing of a metalworking tool with respect to workpieces.

10 Claims, 7 Drawing Figures

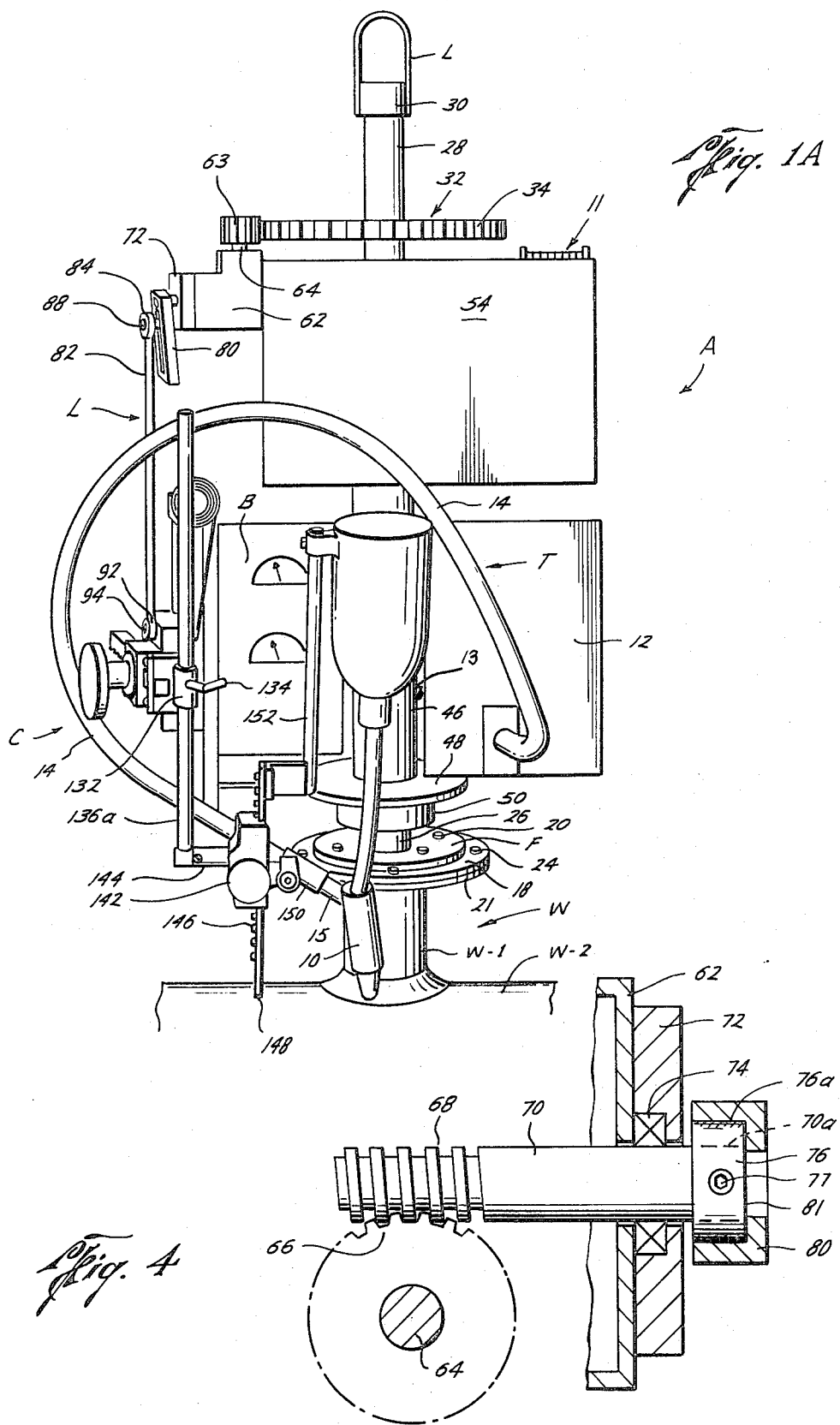

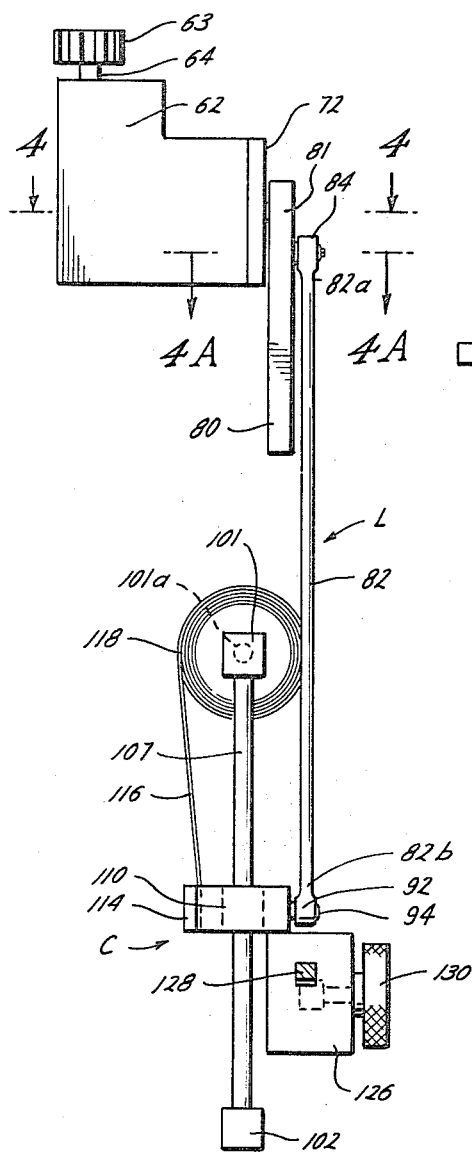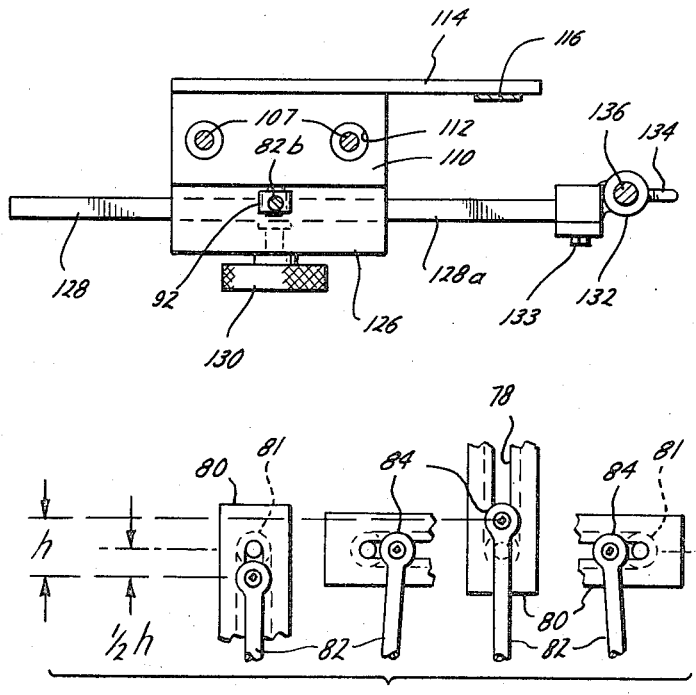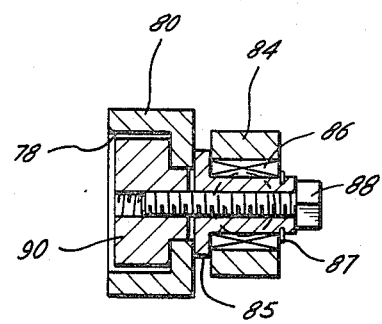

CONTROL APPARATUS FOR METALWORKING TOOLS

CROSS-REFERENCE TO RELATED APPLICATIONS

The present invention is a continuation-in-part of my prior United States patent application Ser. No. 100,573, filed Dec. 22, 1970 and now U.S. Pat. No. 3,741,555.

BACKGROUND OF INVENTION

1. Field of the Invention

The present invention relates to control apparatus for metalworking tools, such as welding torches, cutting tools and the like.

2. Description of the Prior Art

The prior art apparatus for controlling the spacing of a metalworking tool with respect to a workpiece during movement of the tool, such as that of U.S. Pat. Nos. 2,429,413; 3,032,328; and 3,612,502, used a probe in contact with the workpiece to control spacing between the tool and the workpiece. The probe was often misaligned and bent or broken during movement and transportation of the apparatus and during mounting and unmounting of the apparatus on the workpiece, damaging the probe end and reducing the accuracy of control by the probe.

Other prior art apparatus, such as that of U.S. Pat. Nos. 3,388,901 and 3,417,979 required cam rings or templates to define and control movement of the tool along the workpath. New and different cam rings and templates were required for each different type and size of workpiece, increasing the complexity and cost of the apparatus.

SUMMARY OF THE INVENTION

Briefly, the present invention comprises a new and improved apparatus and tool for controlled movement and spacing with respect to a workpiece as the tool moves along a workpath on the workpiece during metalworking operations. A carriage supports the tool adjacent the workpath and a motor drives the tool along the workpath. As the tool is being driven along the workpath, a linkage driven by a suitable drive means moves the carriage with respect to the workpiece to control the spacing between the tool and the workpiece.

It is an object of the present invention to provide a new and improved apparatus and tool for controlled movement and spacing with respect to a workpiece during metalworking operations.

BRIEF DESCRIPTION OF THE DRAWINGS

FIGS. 1 and 1A are elevation views of the apparatus of the present invention;

FIG. 2 is a view taken along the lines 2—2 of FIG. 1;

FIG. 3 is a cross-sectional view taken along the lines 3—3 of FIG. 1;

FIG. 4 is a cross-sectional view taken along the lines 4—4 of FIG. 2;

FIG. 4A is a cross-sectional view taken along the lines 4A—4A of FIG. 2; and

FIG. 5 is a schematic diagram of the operation of the present invention.

DESCRIPTION OF PREFERRED EMBODIMENT

Figure 1:
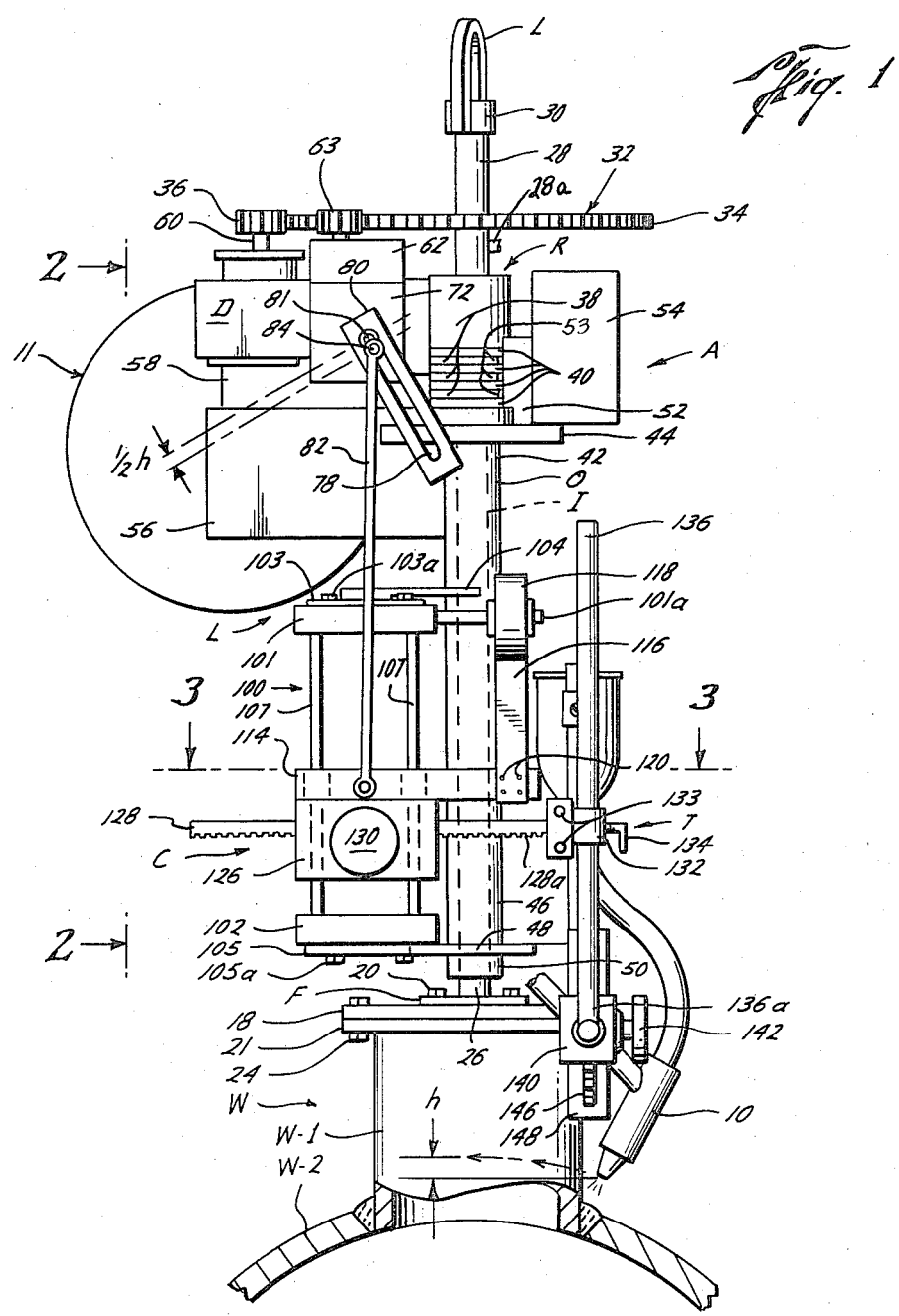

In the drawings, the letter A designates generally the control apparatus of the present invention which controls the position of a metalworking tool T, which may be a welding tool or cutting tool or other suitable metalworking tool, with respect to a workpiece W. In this embodiment, a cylindrical nozzle W-1 is welded by the metalworking tool T to a cylindrical pipe workpiece W-2. The intersection between the cylindrical nozzle W-1 and the cylindrical pipe W-2 defines a curvilinear workpath along which the metalworking tool T travels. As will be set forth below, the apparatus A controls the movement and spacing of the metalworking tool T with respect to the work-piece W as the tool T moves along the work path formed by the intersection of the nozzle W-1 and the pipe workpiece W-2.

It should be understood that other types of metalworking tools, such as cutting torches, and welding tools using submerged arc, flux-cored, or gas shielded welding techniques may be used as the metalworking tool T. It should further be understood that the apparatus A may be used to control the spacing of the metalworking tool T with respect to other types of workpieces such as pressure vessels, either spherical, or cylindrical, or flat metal members, or other pipes, or other suitable configurations of workpieces.

A welding nozzle or head 10 welds the nozzle workpiece W-1 to the pipe workpiece W-2 in the preferred embodiment of the invention. A coil or reel of welding rod or wire is stored in a storage reel 11. The welding wire is extracted from the reel 11 and fed to a welding control box 12. The welding control box 12 further receives welding gas through a suitable gas conduit system.

The welding rod and the welding gas are formed into a weld mix in the control box 12 and are conveyed through a flexible conduit 14 from the control box 12 to a rigid gas inlet conduit 15 mounted with the welding head 10. The conduit 15 conveys the welding mix from the flexible conduit 14 to the welding head 10 so that the nozzle workpiece W-1 is welded to the pipe workpiece W-2.

The apparatus A is mounted by a mounting flange F to a mounting plate 18 with bolts 20 or other suitable mounting means. The mounting plate 18 is of like diameter to a flange 21 formed at an upper end of the nozzle workpiece W-1. The mounting plate 18 has a plurality of apertures formed therein through which a plurality of bolts 24 or other suitable mounting means are inserted in order to attach the mounting plate 18 and the apparatus A to the workpiece W-1.

It should be understood that when the workpiece W-1 is of like diameter to the flange F, the apparatus A may be mounted directly to the workpiece W-1 with the mounting flange F.

A tubular inner support I, of steel or other suitable material, and an outer support O, of similar material support the apparatus A on the workpiece W. The outer support O, as will be set forth below, is freely rotatably movable with respect to the inner support I.

The inner support I is welded or otherwise suitably mounted at a lower end 26 to the mounting flange F. As will be set forth below, suitable connections are provided to communicate electrical energy and gas from the inner support I to the outer support O in order that continuing rotational movement of the metalworking tool T with respect to the workpiece W takes place during metalworking operations.

A cylindrical plug is formed in the interior of the lower end 26 of the inner support I in order to seal the lower end and prevent welding gas from escaping therethrough. A similar cylindrical plug or plate is formed in the interior of an upper portion 28 of the inner support I.

A gas inlet 28a is formed in the inner support I intermediate the sealing plugs therein so that welding gas for the metal-working tool T flows from a suitable storage receptacle into an interior passageway formed within the inner support I and sealed by the plugs at the ends 26 and 28 of such inner support. A gas outlet formed in the inner support I permits the welding gas to flow from the interior of such inner support to an annular passageway between the inner support I and the outer support O.

The annular passageway is sealed by suitable sealing means to prevent welding gas from escaping from the annular passageway during rotational movement of the outer support O with respect to the inner support I. An aperture is formed in the outer support O and a welding gas outlet conduit 13 is mounted therein to convey the welding gas to the control box 12. The gas outlet conduit 13 is attached to the outer support O and is accordingly freely movable with respect to the inner support I and does not tangle or wind about the inner support I during rotational movement of the outer support O. Reference is here made to my prior co-pending application now U.S. Pat. No. 3,741,555, issued June 26, 1973. for further details of the gas conduit system, although it should be understood that other gas conduit systems may be used if desired.

A cap 30 is mounted with the upper end 28 of the inner support I and is secured thereto by suitable securing means. A U-shaped lifting lug L is welded or otherwise suitably firmly attached with the cap 30 to permit a hook or other suitable means to be inserted therein and lift the apparatus A to move the apparatus A into a position on the workpiece W. After metalworking operations are completed, the lifting means is reinserted into the lifting lug L to lift the apparatus A from the workpiece.

A gear support plate 32 is mounted with the exterior of the inner support I adjacent the upper end 28 thereof. A plurality of gear teeth 34 are formed along the periphery of the gear plate 32 and engage a spur gear 36 to drive the outer support O rotatably with respect to the inner support I.

A passageway is formed in the plate 32 for passage of suitable electrical conductors to convey electrical power to an electric commutator or slip ring arrangement R. The electrical conductors are electrically connected to a plurality of conductive slip rings 38. The slip rings 38 are separated from each other by a plurality of insulative bushings 40, which prevent electrical contact between adjacent slip rings 38. Suitable insulating means and structure are used to mount the slip rings 38 and bushings 40 to the inner support I.

The slip rings 38 furnish electrical energy to the control box 12 and the metalworking tool T to form the welding mix therein and to a welding mix feed motor mounted within the control box 12. Other conductive slip rings 38 furnish electrical energy to a drive motor D which drives the outer support O and structure to be set forth below, mounted therewith rotatably with respect to the inner support I. Reference is made to my prior co-pending application for further details of the electrical energy supply to the apparatus A, although it should be understood that other electrical power supply arrangements may be used, if desired.

The outer housing O is welded or otherwise suitably affixed at an upper end 42 thereof to a lower surface of an upper support plate 44. The outer support O is mounted in a like manner at a lower end 46 to an upper surface of a lower support plate 48.

The outer support O, the upper support plate 44 and the lower support plate 48 are freely rotatably movable with respect to the inner support I and permit rotational movement of the metalworking tool T with respect to the workpiece W and the mounting flange S and inner housing I, in order that continuing rotational movement of the tool T may continue in accordance with the metalworking requirements of such tool.

A lower flange bearing mounted within an annular bearing housing 50 is mounted with the inner support I beneath the lower support plate 48 to provide support for the outer support O and permit rotational movement of the outer support O with respect to the inner support I. The lower flange bearing is confined within the housing 50 adjacent the inner support I beneath the support plate 48. An outwardly extending portion of the annular bearing housing is mounted with a lower surface of the lower support plate 48 by suitable fastening means.

The lower flange bearing engages the lower support plate 48 and assists in supporting the outer support O while permitting free rotational movement of the outer support O with respect to the inner support I.

An upper flange bearing, of like structure to the lower flange bearing is mounted with the inner support I above the upper support plate 44 by suitable mounting means. The outer race of the flange bearing is freely rotatable with respect to the inner race thereof and with respect to the inner support I.

A first brush mounting member 52 is mounted with the upper surface of the upper plate 44 by suitable fastening means. The brush mounting member 52 supports a plurality of copper brushes 53, corresponding in number to the slip rings 38 mounted with the inner support I.

Each of the copper brushes 53 in the brush mounting member 52 is mounted so that such conductors are insulated from the remaining structure of the apparatus A.

A protective shield 54 is mounted with the upper support plate 44 to protect the electrical brushes mounted in the brush mounting 52 and the slip rings 38 from dust and moisture and other undesirable conditions to prevent such undesirable conditions from interfering with the electrical contact between the slip rings 38 and the brushes.

The storage reel 11 is rotatably mounted with respect to the upper support plate 41 by an axle thereof. The storage reel 11 rotates together with the support plate 41 and the outer support plate O with respect to the inner support I and the workpiece W during metalworking operations.

A support member 56 mounted with the support plate 44 extends outwardly therefrom and has mounted therewith an upwardly extending bracket 58 to which the drive motor D is mounted.

The drive motor D may be any suitable electrical drive motor, such as the types set forth in my prior co-pending application. The drive motor D drives the spur gear 36 by means of a drive shaft 60 so that the spur gear 36 engages the gears 34 mounted with the support plate 32 so that the drive motor M moves the metal-working tool T along the work path defined by the intersecting workpieces W-1 and W-2.

A suitable motor control box B, such as the type set forth in my prior co-pending application, (FIG. 1A) controls the speed and operation of the drive motor D during metal-working operations.

A gear 63 of a drive gearbox 62 responds to the gears 34 on gearplate 32 as the outer support O is driven about the inner support I by drive motor D. A shaft 64 rotates with the gears 63. A lower gear 66 (FIG. 4) mounted with the shaft 64 drives a worm gear 68. The gear 66 responds to movement of the shaft 64 during rotational movement of the outer support O to cause rotational movement of the worm gear 68. The worm gear 68 drives a driving shaft 70 extending outwardly through a cover plate 72 mounted with the drive gear box 62. The worm gear 68 and the gears 63 and 66 have a gear ratio chosen so that the shaft 70 makes two revolutions in response to the drive motor D and outer support O traveling one revolution with respect to the inner support I.

A bearing 74 is mounted between the cover plate 72 and the drive gear box 62. A collar 76 is mounted at an outer end 78 of the shaft 70 by a set screw 77. The collar 76 is welded or otherwise suitably mounted along an outer surface 76a in a receiving slot 78 formed in an arm 80.

The arm 80 is rotatably driven about a rotational center 81 thereof by the shaft 70 of the drive gear box 62. The rotational center 81 is the axis of rotation of the shaft 70 (FIG. 4) about which the arm 80 rotates.

A linkage L of the apparatus A, mounted with the arm 80 in a manner to be set forth below, drives a carriage C having a tool T mounted therewith. The linkage L, the carriage C, the arm 80 and the drive gear box 62 control the spacing between the metalworking tool T and the workpiece W as the tool T moves along the workpath on the workpiece W.

The linkage L includes an elongate rod 82 having an upper socket 84 (FIG. 2 and 4A) formed at an upper end 82a thereof. A receiving socket member 85 (FIG. 4A) is mounted with a bearing 86 by a clamp ring 87 in the upper socket 84 of the rod 82. The bearing 86 permits rotational movement between the rod 82 and the receiving socket member 85 for reasons to be set forth below.

A bolt 88 extends through the receiving socket member 85 (FIG. 4A) into a T-slot nut 90 mounted within the arm 80. The T-slot nut 90 and bolt 88 rotate with the arm 80 about the center 81 thereof as the outer support O moves the tool T along the workpath in response to the drive motor D. The rotational movement of the bolt 88 causes the upper socket 84 and the receiving socket member 85 to move the rod 82 during rotational movement of the arm 80 (FIG. 5).

The bolt 88 may be loosened with respect to the T-slot nut 90 in order that the T-slot nut 90 may be moved within the receiving slot 78 (FIG. 4A) formed in the arm 80. The T-slot nut 90 thus permits the arm 82 of the linkage L to be eccentrically mounted with the receiving slot 78 formed in the arm 80. The movement of the T-slot nut 90 within the receiving slot 78 in the arm 80 further permits the spacing between the mounting bolt 88 and the center 81 of the receiving arm 80 to be adjusted in order to control the amount of movement of the carriage C by the linkage L. As will be set forth below, adjusting the spacing between the center 81 of the arm 80 and the T-slot nut 90 a distance one-half h (FIG. 1) causes movement of the carriage C and the metalworking tool T mounted therewith of a distance h when the workpiece W-1 is a cylindrical nozzle being mounted with a tubular workpiece W-2.

A lower socket 92 is formed at a lower end 82b (FIGS. 1 and 2) of the rod 82. The lower socket 92 receives a pin 94 therein. The pin 94 is rotatably movable with respect to the socket 92 and attaches the rod 82 to the carriage C. The rotational movement between the pin 94 and the socket 92 permits the carriage C to move vertically with respect to a rack 100 in response to movement of the upper end 82a of the rod 82 by the arm 80.

The rack 100 includes an upper support 101 and a lower support 102. The upper support 101 is mounted with a support plate 103 by bolts 103a or other suitable means. The upper support plate 103 is attached to the outer support O by a support flange 104 and accordingly permits the tool T to move with the outer support O during metalworking operations.

The lower support 102 of the rack 100 is mounted to a support plate 105 by bolts 105a. The lower support plate 105 is welded or otherwise suitably mounted with the support plate 48 at the lower end 46 of the outer support O in order that the tool T moves with the outer support O during metalworking operations. A plurality of columns 107 extend between the upper support 101 and the lower support 102 of the rack 100.

Considering the carriage C more in detail (FIGS. 2 and 3), a mounting bracket 110 having passages 112 formed therein moves with respect to the columns 107 of the rack 100 in response to the arm 82 of the linkage L. Suitable ball bushings may be mounted between the columns 107 and the bracket 110 in the passages 112 if desired. The bracket 110 and rack 100 confine the movement of the carriage C to substantially vertical movement in response to the linkage L.

An arm 114 extends outwardly from the bracket 110 and has a lower end 116 of a resilient spring 118, known in the art as a "negator spring," mounted therewith by suitable means 120.

The remainder of the resilient spring 118 is coiled about a rod 101a extending outwardly from the upper support 101 of the rack 100. The resilient spring 118 is thus mounted between the upper support 101 of the rack 100 and the bracket 110 of the carriage C and the spring or resiliency of the spring 118 exerts a continual force on the carriage C during movement thereof so that the load exerted by the carriage C on the linkage L and the remainder of the movement control structure of the present invention is maintained substantially constant.

The carriage C includes an attachment sleeve 126 mounted with the bracket 110 (FIG. 2). The attachment sleeve 126 receives a toothed support arm 128 therein. A knob 130 mounted with the sleeve 126 controls the force exerted by the sleeve 126 on the support arm 128. Accordingly, the force exerted by the sleeve 126 on the support arm 128 may be released in order to permit relative movement between the sleeve 126 and the arm 128 so that the spacing between the tool T and the carriage C may be adjusted.

A vertical attaching sleeve 132 (FIGS. 1 and 3) is mounted with an outer end 128a of the support arm 128 by bolts 133 or other suitable means. A tension adjusting lever 134 permits the force exerted on a support rod 136 by the sleeve 132 to be released and reengaged as desired in order to permit vertical adjustment of the tool T with respect to the carriage C and the workpiece W.

An adjustment gear in a housing 140 controlled by a knob 142 is mounted at a lower end 136a of the support rod 136 by a suitable attaching means 144. The knob 142 is adjusted by an equipment operator so that the adjustment gear in the housing 140 engages different teeth of a rack gear 146 on a support member 148 for reasons to be set forth below.

A support sleeve 150 is mounted with the support member 148 to support the welding head 10 and the conduit 15 mounted therewith. A support rod 152 is further mounted with the support member 148 to support the remaining portions of the metalworking tool T.

In the operation of the present invention, the user, after tack-welding the workpiece W-1 to the workpiece W-2 in the desired position, determines the curvilinear work path formed by the intersection of the workpieces W-1 and W-2. The user in particular determines the height h of vertical travel of the tool T along the workpath, as well as the diameter of the cylindrical workpiece W-1.

The apparatus A is then lifted by the lug L so that the apparatus A may be mounted to the workpiece W-1 in the manner wet forth above. The user then adjusts the spacing of the tool T with respect to the carriage C by adjustment of the toothed support arm 128 in the manner previously set forth. Further adjustment of the vertical support rod 136 with respect to the sleeve 132 in accordance with the desired initial spacing of the welding head 10 from the work path may also be formed at this time.

The settings of the controls on the weld control box 12 and the motor control box B are then adjusted in accordance with the metalworking operations speed of the tool T, the desired weld thickness and other conventional, known factors.

The eccentric mounting of the T-slot nut 90 within the receiving slot 78 in the arm 80 with respect to the center 81 of rotation thereof is then adjusted a distance one-half h, corresponding to one-half the desired vertical travel $h$ of the welding head 10 during metalworking operations.

Since the workpiece W-1 is cylindrical and intersects a cylindrical workpiece W-2, the curvilinear workpath defined by the workpieces requires that the welding head 10 travel vertically a distance h twice during one revolution along the work path.

As has been set forth, the shaft 70 rotates two revolutions during one revolution of the tool T along the work path. Adjustment of the eccentric mounting of the linkage L with respect to the arm 80 to the distance one-half h causes the linkage L to move a distance h vertically during each revolution of the arm 80 (FIG. 5).

The gear ratio of the gears 63 and 66 and the worm gear 68 causes, as has been set forth, the arm 80 to complete two revolution during one revolution of the tool T with respect to the workpieces. Accordingly, the tool T travels the requisite distance h twice along the workpath in one revolution.

The position of the arm 80 and the linkage L are then adjusted so that the carriage C is at a lowermost position with respect to the rack 100 simultaneous with the welding head 10 being at a lowermost position with respect to the workpath.

The apparatus A is then energized and the drive motor D drives the outer support O and the tool T mounted therewith with respect to the inner support I by means of the gears 36 and 34.

As the drive motor D moves the tool T with respect to the workpath, the gear 63 of the gear reduction box 62 engages the gears 34 on the gear support plate 32 and causes rotational movement of the shaft 70 in the gear reduction box 62 causing the arm 80 to rotate about the center 81 thereof. As the arm 80 rotates about the center thereof, the arm 82 of the linkage L moves the carriage C substantially vertically due to the mounting thereof with the rack 100 and the bracket 110.

The linkage L thus causes substantially vertical movement of the carriage C and the tool T mounted therewith during rotational movement of the tool T along the curvilinear workpath caused by the drive motor D. In this manner, the apparatus of the present invention controls the movement and spacing of the metalworking tool T with respect to the workpieces W-1 and W-2 as the tool T moves along the workpath on the workpiece.

It should be understood that the gear reduction by the gears in the drive gear box 62 may be varied in accordance with the type of workpieces upon which metalworking operations are performed. For example, an increase in the gear reduction ratio in the drive gear box 62 by a factor of 2 has a like effect to reducing the speed of metalworking operations by one-half. Further, it should be understood that adjustments in the eccentric mounting of the arm 82 with respect to the rotating arm 80 by means of the T-slot nut 90 may be accomplished when irregular and off-center cylindrical workpieces are being joined with other cylindrical or spherical workpieces during metalworking operations.

The foregoing disclosure and description of the invention are illustrative and explanatory thereof, and various changes in the size, shape, and materials as well as in the details of the illustrated construction may be made without departing from the spirit of the invention.

I claim:

1. An apparatus for controlling the movement and spacing of a metalworking tool with respect to a workpiece as the tool moves along a workpath on the workpiece, comprising:
   a. carriage means for supporting the tool adjacent the workpath;
   b. motor means for moving the tool along the workpath;
   c. control means for moving said carriage means with respect to the workpiece to control the spacing therebetween as the tool is moved along the workpath;
   d. drive means responsive to said motor means for driving said control means;
   e. inner support means mounted on the workpiece;

f. outer support means rotatably mounted on said inner support means;

g. rack means mounted on said outer support means for supporting said carriage means during movement thereof; and h. resilient means mounted between said rack means and said carriage means for exerting a continual force on said carriage means whereby the load exerted by said carriage means on said control means is maintained substantially constant.

2. The structure of claim 1, wherein said control means comprises:

a. arm means rotatably driven about a center thereof by said drive means;

b. said arm means having a receiving slot formed therein;

c. linkage means for moving said carriage means with respect to the workpiece to control the spacing therebetween; and d. means for mounting said linkage means in said receiving slot of said arm means.

3. The structure of claim 2, wherein said means for mounting comprises:

means for eccentrically mounting said linkage means in said receiving slot of said arm means.

4. The structure of claim 2, further including:

means for adjusting the spacing between said means for mounting and said center of said arm means wherein the amount of movement of said carriage means by said linkage means is adjusted.

5. The structure of claim 1, wherein said control means comprises:

a. rotatable means responsive to said drive means; and b. linkage means responsive to said rotatable means for controlling the spacing between said carriage means and the workpiece.

6. The structure of claim 1, further including:

means for adjusting the spacing between the tool and said carriage means wherein the apparatus may be used with workpieces of different sizes.

7. The structure of claim 2, wherein the workpath is a curvilinear workpath and wherein:

a. said motor means comprises means for rotatably moving the tool along the curvilinear workpath; and b. said linkage means comprises means for moving said carriage means substantially vertically with respect to the workpiece to control the spacing therebetween as said motor means rotatably moves the tool along the workpath.

8. A metalworking tool for controlled movement and spacing with respect to a workpath along a work-piece during metalworking operations, comprising:

a. metalworking tool means;

b. carriage means for supporting said tool means adjacent the workpath;

c. motor means for moving said tool means along the workpath;

d. control means for moving said carriage means with respect to the workpiece to control the spacing therebetween as said tool means is moved along the workpath;

e. drive means responsive to said motor means for driving said control means;

f. inner support means mounted on the workpiece;

g. outer support means rotatably mounted on said inner support means;

h. rack means mounted on said outer support means for supporting said carriage means during movement thereof; and i. resilient means mounted between said rack means and said carriage means for exerting a continual force on said carriage means wherein the load exerted by said carriage means is maintained substantially constant.

9. An apparatus for controlling the position of a metalworking tool with respect to a curvilinear workpath along which the workpieces are worked, permitting continuing rotational movement of the tool with respect to the workpieces comprising:

a. means for mounting the apparatus with the work;

b. inner support means for supporting the apparatus, said inner support means being fixedly mounted with said mounting means, said inner support means comprising:

1. gas inlet means for receiving gas to be provided to the working tool;

2. gas outlet means for dispensing the gas from said inner housing means; and 3. sealing means adjacent said gas outlet means for preventing leakage of the gas;

c. outer support means rotatably movable with respect to said inner support, said outer support means comprising gas conduit means for conveying gas to the working tool from said gas outlet means during rotational movement of the working tool, wherein the working tool receives electrical energy and gas during continuing rotational movement of the working tool with respect to the work;

d. carriage means for supporting the tool adjacent the workpath;

e. motor means for moving the tool along the workpath;

f. drive means responsive to said motor means; and g. control means driven by said drive means for moving said carriage means with respect to the workpiece to control the spacing therebetween as the tool is moved along the workpath, said control means comprising:

1. arm means rotatably driven about a center thereof by said drive means, said arm means having a receiving slot formed therein;

2. linkage means for moving said carriage means with respect to the workpiece to control the spacing therebetween; and 3. means for mounting said linkage means in said receiving slot of said arm means.

10. The structure of claim 9, further including:

a. rack means mounted on said outer support means for supporting said carriage means during movement thereof; and b. resilient means mounted between said rack means and said carriage means for exerting a continual force on said carriage means wherein the load exerted by said carriage means on said control means is maintained substantially constant.

* * * * *